United States Patent Office 3,565,559
Patented Feb. 23, 1971

3,565,559
PROCESS FOR MAKING MICROCAPSULES
Nobuyasu Sato, Itami-shi, Toshio Nakamura, Ibaragi-shi, and Ryota Oishi, Hirakata-shi, Japan, assignors to Sumitomo Chemical Company, Ltd., Osaka, Japan, a corporation of Japan
No Drawing. Filed Mar. 6, 1969, Ser. No. 805,031
Claims priority, application Japan, Mar. 11, 1968, 43/16,030
Int. Cl. A61k 9/04; B01j 13/02; B44d 1/02
U.S. Cl. 424—37                                     7 Claims

ABSTRACT OF THE DISCLOSURE

Process of making microcapsules of active chemical substances, for example, to prevent vitamin A from air-oxdiation, coating pigment particles in carbonless paper, etc., which consists of (1) forming an aqueous emulsion or suspension of the active chemical substance, (2) adding an aqueous solution of a gelable hydrophilic substance and then surface active agent and dispersing a liquid solvent immiscible with the said emulsion or suspension or (2') dispersing a mixture of the surface active agent and the liquid solvent into the aqueous emulsion or suspension, to form a dispersion at a temperature above a gelatin point of the emulsion or suspension, (3) adding a solvent miscible with the above-said solvent but immiscible with the emulsion or suspension or (3') raising the dispersion temperature to an inversion temperature or (3″) in case the used surface active agent is mono-valent metallic and adding an aqueous solution containing multi-valent metallic ion, to inverse the dispersion phase to form droplets, (4) stirring, (5) cooling to the above said gelation point to cause the droplets to form microcapsules, (6) adding an aqueous electrolyte solution to harden the microcapsules, (7) adding water-absorptive substance to coat the microcapsules or (7') washing and dehydrating the microcapsules by lower alkyl alcohols, (8) filtering to separate the microcapsules, and (9) drying the microcapsules.

---

This invention relates to a method of making microcapsules. More particularly this invention relates to a method of making microcapsules by phase-inversion of an oil-in-water dispersion containing chemical substance.

There have heretofore been proposed several methods of making microcapsules. For example, U.S. Pat. Nos. 2,800,457, 2,800,458 and others disclosed a method in which, in accordance with the so-called "coacervation method," a core substance and a liquid wall substance were dispersed in a liquid solvent and the wall substance in the form of liquid was deposited onto the core substance, and subsequently the resulting liquid wall was converted to a solid wall by such methods alone or in combination thereof as a temperature gelatin, removal of solvent, use of washing liquid, cross linking, chelation and the like. As another example, Japanese patent publication No. 38/19,574 and others disclosed a method of making microcapsules according to so-called a "polymerization method" and in which polymerizable monomers were polymerized at the surface of dispersed droplets.

These conventional methods, however, have various disadvantages. For example, in the so-called "coacervation method," the liquid solvent must be incapable of dissolving the core substance but, at the same time, be capable of dissolving the wall substance forming the liquid wall; the conversion of the liquid wall to the solid wall requires complicated conditions and a long period of time; the microcapsule obtained according to the "coacervation method" is poor in the strength of the wall, so that the capsule will easily break during handling and the content will exude.

Besides, in the so-called "polymerization method," it is difficult to adjust the polymerization condition in order to obtain uniform wall depth.

In each of the above-mentioned methods, the particle size or diameter of the capsules is controlled mainly by the rate of stirring the liquid solvent, so there are considerable problems in the distribution of particle sizes, reproduceability, scale effect and the like.

As a result of various investigations the present inventors have found a method in which uniform microcapsules can be obtained by a simple operation without such disadvantages.

An object of this invention is to provide stable spherical microcapsules.

Another object of this invention is to provide such microcapsules in apparently dry form.

Other object of this invention is to provide a process for producing microcapsules in which particle size of microcapsules is easily controlled, by simple method without controlling the troublesome environmental conditions of its manufacture.

Further object of this invention is to provide microcapsules at a low cost.

In order to accomplish these objects, the present invention provides a method for producing microcapsules of active chemical substance, which comprises the steps of:

(1) Forming an aqueous emulsion or suspension of an active chemical substance with an emulsifier or suspending agent, (2) Adding an aqueous solution of a gelable hydrophilic substance to said emulsion or suspension obtained in step (1), (3) Adding a surface active agent to the said emulsion or suspension obtained in step (2) or (4) Adding a surface active agent to a solvent immiscible with said emulsion or suspension, (5) Dispersing a liquid solvent immiscible with said emulsion or suspension into said emulsion or suspension obtained in step (3) or dispersing a mixture consisting of a surface active agent and a liquid solvent obtained in step (4) into said emulsion or suspension obtained in step (2), (6) Inversing the phase of said dispersion obtained in Step (5) to form droplets:

(a) By adding an enough amount of a liquid solvent to inverse the phase, the solvent being miscible with said solvent used in step (5) but immiscible with the emulsion or suspension or (b) By raising the temperature of said dispersion up to an inversion temperature thereof, or (c) In case a mono-valent metallic surface active agent is used as the surface active agent in step (3) or (4), by adding an aqueous solution containing multi-valent metallic ion, the steps of (1), (2), (3), (4), (5), and (6) being conducted at a temperature above a gelation point of the aqueous emulsion or suspension.

(7) Stirring and then cooling the mixture obtained in step (6) to a temperature below the gelation point of the aqueous emulsion or suspension to cause the droplets gel to form microcapsules, (8) Adding an aqueous solution of electrolyte to the mixture obtained in step (7) to harden the microcapsules, or (9) Adding water-absorptive substance to the mixture obtained in step (7) to coat the microcapsules, or

(10) Washing and dehydrating by lower alkyl alcohols the microcapsules obtained in step (7),

(11) Separating the microcapsules obtained in step (8), (9) or (10) by filtration, and

(12) Drying the microcapsules separated in step (11).

The feature of the present invention resides in that a continuous phase of the aqueous emulsion or suspension is changed to a discontinuous phase of microspherical droplets by phase inversion in the presence of a surface active agent.

In the present invention, the chemical substance is any kind of active chemical substance capable of forming an emulsion or suspension without any regard to whether it is water-soluble or oil-soluble and whether it is a solid or liquid.

Examples of the chemical substance of the present invention include any chemically synthetic compound, extracts of animal or vegetable ingredient, fermentation product of bacteria and irrespective of the kind. It may be oil or fat, oil soluble substance or oil insoluble solid substances.

Among the oils or fats which are water-immiscible, are the vegetable oils such as corn oil, peanut oil, cottonseed oil, sesame oil, olive oil, coconut oil and castor oil; essential oils from plants; mineral oils such as petroleum fractions; animal oils such as sperm oil; fish oils such as halibut liver oil; waxes such as beeswax and wool wax; higher aliphatic alcohols such as lauryl, cetyl, palmityl, stearyl and oleyl alcohol; higher aliphatic acids such as lauric, palmitic, stearic, oleic and linolic acid and synthetic oils such as methyl salicylate, chlorinated diphenyl.

Among the oil soluble substances are oil soluble dyes, adhesives, fat soluble vitamins, and the like.

Among the oil insoluble solid substances are dyes such as used in making inks, medicines, food supplement and other materials which it is desired to have protected from the environment or which it is desired to have isolated for other reasons.

The method of making microcapsules of the present invention will be explained in order of steps as follows.

In the step (1), i.e. formation of an aqueous emulsion or suspension of a chemical substance, oily substance is emulsified according to the general emulsifying procedure with an emulsifier, oil soluble substance is emulsified after dissolved in an oil or fat mentioned above or an organic solvent, and oil insoluble solid substance is dispersed in oil or fat mentioned above after pulverized, and then prepared the emulsion, or oil insoluble solid substance which is insoluble in water is dispersed in water directly as a suspension after pulverized according to a conventional procedure. In the present invention, general natural or synthetic emulsifier or suspending agent are employed. Examples of them are acacia, tragacanth, methylcellulose, lecithin, cholesterol and its ester, magnesium trisilicate, bentonite and many surface active agents mentioned below.

In the step (2), an aqueous solution of a gelable hydrophilic substance which will gel when cold is added to such emulsion or suspension obtained in the step (1). Or the chemical substance may be directly emulsified or suspended with this gelable hydrophilic substance. Further, in case it is necessary to reinforce the film of the microcapsules according to the object of the use, there may be added to the emulsion or suspension obtained in step (1), each plasticizer as sucrose, sorbitol, molasses, glycerin propylene glycol, or the like, or such polymer as methylcellulose, polyvinyl pyrrolidone, cellulose acetate phthalate, polyvinyl alcohol, polyvinyl acetate, shellac, cellulose acetate, carboxylated vinyl acetate, polyacrylic acid, polymethacrylic acid or the like.

Examples of the gelable hydrophilic substance used in the presence invention include gelatin, agar-agar, albumin, alginates, casein, pectin and fibrinogen. These gelable hydrophilic substances can be used alone or in a combination of two or more. Among them, gelatin produces favorable results, and either gelatin pre-treated on an alkali or an acid in the producing process may produce same results.

The gelable hydrophilic substance may be added in an amount more than that sufficient to cause the gelation of the whole mixture by cooling. This step is conducted at a temperature above the gelation point of the obtained emulsion or suspension in this step (2).

In the step (3), a surface active agent is added to the aqueous emulsion or suspension obtained in the step (2).

Examples of the surface active agents to be used in the present invention, include such anionic surface active agents as alkali metal salts of higher fatty acids, sulfuric acid ester salts of higher alcohols, higher fatty acid esters and higher fatty acid alkylolamide, sulfonates of higher alkyls, alkylaryls, alkylated fatty acid amides and higher fatty acid esters, and phosphoric acid ester of higher alkyls, such cationic surface active agents as amine salts of long chain alkyls, quaternary ammonium salt and pyridinium salt and amphoteric surface active agents having amino radicals and carboxyl radicals or amino radicals and sulfuric acid or sulfone radicals.

Examples of the nonionic surface active agents include polyoxyethylene alkylethers, polyoxyethylene alkylphenol ethers, condensated derivatives of formaldehyde with polyoxyethylene alkylphenols, polyoxyethylene fatty acid esters, polyoxyethylene alkylamide, alkylolamide, polyoxyethylene alkylamine, polyoxyethylene lanoline alcohol, fatty acid esters of such polyhydric alcohols as ethylene glycol, propylene glycol, glycerine, sucrose and sorbitol or their anhydrides, and polyoxyethylene derivatives of fatty acid esters of the abovementioned polyhydric alcohols or their anhydrides, polyoxyethylene derivatives of such natural oils, fats and waxes as castor oil, hydrogenated castor oil, lanolin and beeswax, so called block polymer types such as Pluronic and Tetronic. The surface active agent is not necessarily dissolved, but, even in the state of dispersion thereof, the good result can be obtained without any difficulty. The amount of the surface active agent used varies depending on the desired particle size of a microcapsule and the kind of the surface active agent, but it is sufficient to employ the surface active agent in an amount of 0.1 to 10%, based on the weight of the emulsion or suspension.

Even if the surface active agent used in the step (3) is same with the emulsifier or suspending agent used in the step (1), the microcapsules can be formed by increasing the amount of the emulsifier or suspending agent in the step (1).

The particle size of the microcapsules is varied depending on the degree of the surface activity of the surface active agent employed. When the hydrophilic property of the surface active agent is strong, the particle size of the microcapsules becomes small. And, employment of a surface active agent having a sufficiently strong hydrophilic property gives very minute microcapsules of 0.5 micron or less in the particle size. On the other hand, employment of a surface active agent having a strong lipophilic property gives microcapsules having such a large particle size as of 10 mm. Alternatively, however, the particle size can be adjusted also by controlling the amount of the employed surface active agent in a certain range of a particle size. Accordingly, the adjustment of the particle size is achieved by selection of the kind and the amount of the surface active agent.

In the step (4), a mixture of a liquid solvent immiscible with said aqueous emulsion or suspension and a surface active agent is prepared. The surface active agent is used in a manner similar to that in the step (3).

As to the liquid solvent of the present invention, there may be employed any liquid solvent which is immiscible with the emulsion or suspension without any regard to viscosity and specific gravity thereof. Examples of the liquid solvent used include such vegetable oils as castor oil, corn oil, peanut oil, sesame oil, and the like, such mineral oils as essential oil, liquid paraffin and the like, such aromatic hydrocarbons as benzene, xylene and the like, such aliphatic hydrocarbons as cyclohexane, normal hexane and the like, such chlorinated hydrocarbons as chloroform, carbon tetrachloride, trichloroethylene and the like and further such organic compounds usually employed as solvent as methylethyl ketone, petroleum, petroleum benzene, ether and the like. The employment of viscous mineral or vegetable oil causes not only the difficulty of after-treatments such as washing but also the difficulty of recovery thereof because of its high boiling point. Therefore, it is preferred to employ an organic solvent such as benzene, hexane or the like, because not only is the washing unnecessary but also the recovery thereof for re-use is possible.

In the step (5), a solvent is dispersed in the emulsion or suspension containing the chemical substance at a temperature above the gelation point of the emulsion or suspension.

In the step (6), the dispersion obtained in the step (5) is subjected to the phase inversion from the oil-in-water type to the water-in-oil type according to any of 3 methods, so that the aqueous emulsion or suspension is dispersed as microspherical droplets in the liquid solvent.

The first method of the phase inversion is carried out by increasing the amount of the liquid solvent at a constant temperature. As the amount of the added liquid solvent is increased, the dispersion system becomes unstable, and by further addition of the solvent, the oil-in-water dispersion system is inverted to the water-in-oil dispersion system to form the microspherical droplets of the aqueous emulsion or suspension. In this case, the amount of the liquid solvent required for the phase inversion varies depending on the amount of the aqueous emulsion or suspension and the surface activity of the surface active agent employed. When the amount of the aqueous emulsion or suspension is constant, the stronger the hydrophilic property of the surface active agent, the more amount of the liquid solvent is required for the phase inversion, and the stronger the lipophilic property of the surface active agent, the less amount of the liquid solvent is requird for the phase inversion.

The second method is carried out by elevating the temperature of the oil-in-water type dispersion system up to an inversion temperature.

In case mono-valent metallic active agent is used as the surface active agent in step (3), the third method is carried out by adding an aqueous solution containing multivalent metal ion to the oil-in-water type dispersion system. Examples of the multi-valent metallic ion include aluminium, chromium, nickel, lead, barium, strontium, magnesium and the like.

The completion of the phase inversion of the oil-in-water dispersion system can be recognized by observing the abrupt drop in the viscosity of the dispersion.

In the step (7), the mixture system is cooled to a temperature below the gelation point of the emulsion or suspension to effect the gelation of the dispersed microspherical droplets of the aqueous solution.

The gelation point of the emulsion or suspension varies depending on the concentration and the kind of the gelable hydrophilic substance, and in general it is within a range of 25°–35° C.

During the steps (1) to (7), the stirring of the mixture can be sufficiently effected by the ordinarily employed stirrer, such as turbine, propeller or anchor type stirrer, without requiring a special stirring apparatus.

In the step (8), an aqueous solution of an electrolyte is added into the mixture obtained in the step (7) to harden the microcapsules.

Examples of the aqueous solution of electrolytes to be used in the present invention include aqueous solutions of such salts containing cations as sodium, potassium, magnesium, aluminium, calcium, manganese, cadmium, copper, iron, lithium and ammonium and of such salts having organic or inorganic anions as sulfuric acid, carbonic acid, phosphoric acid, tartaric acid, citric acid, acetic acid, formic acid and iodine. Among them, such sulfates as sodium sulfate, aluminum sulfate and ammonium sulfate bring about favorable results. The amount of addition of such aqueous solution of the electrolyte varies depending on the hardening degree of the solution of the electrolyte, and also the strength of the wall of the microcapsules can be adjusted by the difference of the hardening degree of the electrolyte.

In the step (9), water absorptive substance is added into the mixture obtained in the step (7) to coat the microcapsules.

Examples of the water absorptive substance include starch and its derivatives, such organic substances as casein, crystalline cellulose, calcium salt of carboxymethyl cellulose, oxides of zinc, silicon, magnesium, titanium, aluminium and sulfate of barium, carbonates of calcium and magnesium, silicic acid, silicates of aluminium and magnesium and their mixed double salts, and such water-absorptive substances preferably having a particle size finer than 200 meshes. Among them, specifically starch, talc and silicic acid produce favorable results.

In the step (10), the microcapsules obtained in the step (7) are washed by lower alkyl alcohol. Examples of the lower alkyl alcohol include methanol, ethanol, isopropanol, or the like.

The treatment mentioned in the steps (8), (9) or (10) is effective to prevent coagulation of the microcapsules in the following steps.

In the step (11), the microcapsules are separated from the mixture by filtration.

In the step (12), the microcapsules are dried.

The drying operation can be conducted at a temperature under the gelation point of the microcapsules by means of an ordinary dryer such as an air-blowing dryer, vacuum dryer, spray dryer or fluidized bed dryer.

As is clearly understood from the foregoing description, according to the present invention, the microcapsules can be readily obtained at low cost without employing any special apparatus and the particle size of the capsules is varied widely in the range of 0.5 to 10,000 microns. Moreover it is to be noted that the particle size can be adjusted as desired by selecting the kind or the amount of the surface active agent.

Microcapsules of the present invention find applications due to their unique properties in the formulation of compositions for widely diversified fields of use.

In the cosmetic field such as soap bars, lotions, and creams can be formulated containing coated water-soluble ingredients which would be unstable or incompatible in uncoated form in the presence of other ingredients of the particular formulation. For example, since certain antibacterials such as the chlorinated phenols and neomycin sulfate are incompatible on prolonged contact with soap, the present invention makes possible the formulation of a soap bar containing both of these ingredients and also the present invention is used to make dry power of perfumes such as geraniol, pinene or orange oil.

In the agricultural field, coated fertilizers, pesticides, food supplements and medicaments can be advantageously formulated. For example, water-soluble fertilizers such as ammonium nitrate, urea and superphosphate can be coated for application to the soil when a slow release or extended action is desirable, e.g. when rapid release would "burn" the vegetation. For the control of pests, coated insecticides such as calcium arsenate and copper acetoarsenite can be deposited on vegetation or in the soil without harm to the vegetation, moreover, the insecticide is not dissolved and washed away by moisture or rain, thereby allowing the insecticide to remain where deposited until ingested by the insect. Anthelmintic agents, such as piperazine phosphate or citrate, and methyl-rosaniline chloride, when coated can be incorporated into feed material for domestic animals, the coated anthelmintic thereby being tasteless in the feed and also protected from decomposition during storage of the feed. Rodenticides such as calcium cyanide, thallium sulfate, sodium fluoroacetate and Norbolmide, which are unstable in the presence of moisture or have an odor or taste repellent to the rodent are advantageously coated vitamins, minerals, amino acids and other food supplements, when coated, can be incorporated in animal feeds and be protected from decomposition during storage periods from such adverse conditions as air, moisture, and incompatible ingredients in the feed composition itself such as fat soluble vitamin, vitamin C, carotenoids as coloring agent, methinine or colin chloride. In a similar manner food supplements can be incorporated in compositions for human use.

The present invention finds application in medicinal treatment of both animals and humans. Medicaments can be coated by the methods of the present invention to give a sustained release upon ingestion with resultant sustained therapeutic action such as carbetapentene citrate, caramiphen edisylate as an antitussive agent, or chlorpheniramin maleate, Andantol as anti-histamine agent. Coatings which will not dissolve in the stomach can be formulated to overcome the problem of gastric irritation or nausea caused by such medicaments as emetine hydrochloride, quinacrine hydrochloride and para-amino-salicylic acid. Similarly, medicaments such as penicillin and certain glandular extracts which are inactivated by the acid condition or enzymes encountered in the stomach are advantageously coated.

Further for the general industries the microcapsules of the present invention can be used to make paper coating compositions which form a transfer film to make a dry fuel or to make instantaneous photographs.

The present invention is more fully explained with respect to the following examples, which are provided merely by way of illustration, and not by way of limitation.

EXAMPLE 1

100 mg. of antioxidant B.H.T. and 10 mg. of B.H.A. were dissolved in 21 g. (1,600,000 I.U./g.) of vitamin A palmitate. The resulting solution was emulsified by an ordinary method with 200 ml. of an aqueous solution containing 20% of gelatin and 10% of sucrose, and was added 7 g. of sorbitan monopalmitate maintained the temperature at 50° to 60° C. Into the solution were added with stirring 200 ml. of n-hexane of the same temperature to effect the phase inversion. After completion of the phase inversion, the mixture was cooled to below 10° C. to effect the gelation of the microspherical droplets of the vitamin A emulsion. A liquid in which 13 g. of calcium salt of carboxymethyl cellulose were dispersed in 50 ml. of n-hexane were added to make coating of capsules. After stirring for the time being, the capsules were collected by filtration and were dried by means of a vacuum dryer at 40° C. to obtain spherical capsules containing about 325,000 I.U./g. of vitamin A. The particle size distribution of the products was as follows.

| | Percent |
|---|---|
| Larger than 42 meshes | 1.5 |
| 42 to 60 meshes | 4.8 |
| 60 to 80 meshes | 65.3 |
| 80 to 100 meshes | 23.4 |
| Finer than 100 meshes | 5.0 |

EXAMPLE 2

2.5 g. of β-carotene, 0.25 g. of B.H.T. and 10 g. of peanut oil were dissolved in 60 ml. of chloroform. This chloroform solution was emulsified by an ordinary method with 200 ml. of an aqueous solution containing 87 g. of gelatin and 0.5 g. of citric acid at 50° to 60° C. Into the solution thus obtained were with stirring added 200 ml. of n-hexane of the same temperature in which 8 g. of sucrose stearate was dispersed to effect the phase inversion. After completion of the phase inversion, the mixture was cooled to below 10° C. Whereupon, the capsules were collected by filtration and were dried by means of a vacuum dryer at 40° C. to obtain the water-dispersible coloring agent of 2.5% of β-carotene having the same particle size distribution as discribed in Example 1.

EXAMPLE 3

50 g. of linolic acid were emulsified by an ordinary method with 100 ml. of a 10% aqueous solution of glycerin monostearate. After 100 ml. of an aqueous solution containing 10% of glycerin and 30% of gelatin were added thereto, followed by sufficient stirring, the mixture was maintained at 50° to 60° C. 100 ml. of liquid paraffin of the same temperature were with stirring added to the mixture to effect the phase inversion. After completion of the phase inversion, the mixture was cooled to below 10° C. The filtration, the washing with methanol and the air-blowing drying at about 30° C. gave capsules containing 50% of linolic acid and having a particle size of 5 mm. to 10 mm.

EXAMPLE 4

1.25 g. of vitamin $D_2$ (40,000,000 I.U./g.) were dissolved in 10 g. of peanut oil. The solution was emulsified by an ordinary method with 200 ml. of an aqueous solution containing 15% of glycerin and 30% of gelatin at 50° to 60° C. 150 ml. of a chloroform solution of the same temperature in which 4 g. of hydrogenated castor oil derivative of polyoxyethylene were dispersed were with stirring added to the mixture to effect the phase inversion. After completion of the phase inversion, the mixture was cooled to below 10° C. The filtration and the subsequent drying by means of a vacuum dryer at 40° C. gave spherical capsules containing 500,000 I.U./g. of vitamin $D_2$. The particle size distribution of the capsules thus obtained was as follows.

| | Percent |
|---|---|
| Larger than 60 meshes | 3.2 |
| 60 to 80 meshes | 6.5 |
| 80 to 100 meshes | 17.1 |
| 100 to 150 meshes | 63.4 |
| Finer than 150 meshes | 9.8 |

EXAMPLE 5

10 g. of ascorbic acid were dispersed in 10 g. of melted edible hydrogenated fat. The dispersion was emulsified in 100 ml. of water by an ordinary method with 2 g. of propylene glycol fatty acid ester, and was added with 100 ml. of 60% agar-agar solution at 50° to 60° C. 100 ml. of cyclohexane of the same temperature in which 5 g. of polyoxyethylene cetyl ether were dissolved were added to the mixture with stirring to effect the phase inversion. After completion of the phase inversion, the mixture was cooled to below 10° C., whereupon still stirring 18 g. of dried starch were added to effect the coating, and for the time being, followed by filtration, the resultant was dried by means of a fluidized bed dryer at 40° C. to give spherical capsules containing 100 mg./g. of ascorbic acid. The particle size distribution of the capsules thus obtained was as follows.

| | Percent |
|---|---|
| Larger than 10 meshes | 1.8 |
| 10 to 12 meshes | 7.4 |
| 12 to 14 meshes | 68.8 |
| 14 to 20 meshes | 14.3 |
| 20 to 24 meshes | 5.7 |
| Finer than 24 meshes | 2.0 |

EXAMPLE 6

The same operation as described in Example 5 was repeated with exception that 6 g. of polyoxyethylene sorbitol hexastearate were employed in place of polyoxyethylene cetylether. As a result, there were obtained capsules of ascorbic acid which have the same particle size distribution as described in Example 5.

EXAMPLE 7

5 g. of hydrocortisone acetate were suspended by an ordinary method in 300 ml. of an aqueous solution in which 32 g. of gum arabic and 60 g. of gelatin were dissolved. Into the suspension under stirring were added 3 g. of polyoxyethylene stearate at 50° to 60° C. 250 ml. of cyclohexane of the same temperature were with stirring added to the mixture to effect the phase inversion. After completion of the phase inversion, the mixture was cooled to below 10° C. The filtration and the subsequent drying by means of a vacuum dryer at 40° C. gave spherical capsules containing 50 mg./g. of hydrocortisone acetate. The particle size distribution of the capsules thus obtained was as follows.

|   | Percent |
|---|---|
| Larger than 60 meshes | 5.9 |
| 60 to 80 meshes | 10.8 |
| 80 to 100 meshes | 57.4 |
| 100 to 150 meshes | 19.4 |
| Finer than 150 meshes | 6.5 |

EXAMPLE 8

The same operation as described in Example 7 was repeated with exception that polyoxyethylene lanoline alcohol was employed in place of polyoxyethylene stearate. As a result, there were obtained capsules of hydrocortisone acetate which have the same particle size distribution as described in Example 7.

EXAMPLE 9

0.1 g. of methyl salicylate was dissolved in 10 g. of cotton seed oil. The solution was emulsified in 100 ml. of water with employing 2 g. of Pluronic L-62 ® (Wyandotte Chemical Corp., U.S.A.). To the emulsion thus obtained were added 200 ml. of an aqueous solution in which 50 g. of agar-agar and 10 g. of polyvinyl pyrrolidone were dissolved, whereupon the resulting mixture was maintained at 50° to 60° C. 200 ml. of chloroform of the same temperature in which 2 g. of polyoxyethylene nonylphenol ether were dispersed were with stirring added to the mixture to effect the phase inversion. After completion of the phase inversion, the mixture was cooled to below 10° C. Through the spray drying by a conventional method, there were obtained capsules of methyl salicylate which have the following particle size distribution.

|   | Percent |
|---|---|
| Larger than 42 meshes | 1.4 |
| 42 to 60 meshes | 10.8 |
| 60 to 80 meshes | 59.7 |
| 80 to 100 meshes | 17.4 |
| 100 to 150 meshes | 8.6 |
| Finer than 150 meshes | 2.1 |

EXAMPLE 10

The same operation as described in Example 9 was repeated with exception that oleyl alcohol phosphate and methyl cellulose were employed in place of polyoxyethylene nonylphenol ether and polyvinyl pyrrolidone, respectively. As a result, there were obtained capsules of methyl salicylate which have the same particle size distribution as described in Example 9.

EXAMPLE 11

0.1 g. of peppermint oil was dissolved in 10 g. of peanut oil. The solution was emulsified by an ordinary method in 300 ml. of an aqueous solution in which 52 g. of gelatin, 20 g. of pectin and 10 g. of glycerin were dissolved. To the emulsion under stirring thus obtained were added 8 g. of polyoxyethylene oleylamide ester at 50° to 60° C. 250 ml. of trichloroethylene of the same temperature were with stirring added to the mixture to effect the phase inversion. After completion of the phase inversion, the mixture was cooled to below 10° C. Through the spray drying by a conventional method, there were obtained microcapsules containing 0.1% of peppermint oil and having a particle size of 100 to 200 meshes.

EXAMPLE 12

The same operation as described in Example 11 was repeated with exception that 4 g. of Pluronic F-68 ® (Wyandotte Chemical Corp., U.S.A.) were employed in place of polyoxyethylene oleylamide ester. As a result, there were obtained microcapsules of peppermint oil which have the same particle size distribution as described in Example 11.

EXAMPLE 13

30 g. of peanut oil were emulsified by an ordinary method in 200 ml. of an aqueous solution dissolving 65 g. of gelatin. To the emulsion thus obtained were added under stirring 5 g. N-laurylamino propionate at 50° to 60° C. 200 ml. of carbon tetrachloride of the same temperature were with stirring added to the mixture to effect the phase inversion. After completion of the same temperature, the mixture was cooled to below 10° C. After cooling, 20 ml. of a 20% aqueous solution of sodium sulfate were added to the mixture, followed by the stirring for the time being. The filtration and the subsequent drying by means of a fluidized bed dryer gave microcapsules containing 30% peanut oil and having a particle size in the range of 100 to 200 meshes.

EXAMPLE 14

30 g. of gasoline were emulsified by an ordinary method in 200 ml. of a 35% aqueous solution of gelatin. To the emulsion thus obtained was added under stirring 1.0 g. of sodium oleate at 50° to 60° C. 100 ml. of benzene of the same temperature were with stirring added to the mixture, and 10 ml. of a 20% aqueous solution of magnesium chloride were further added thereto to effect the phase inversion. After completion of the phase inversion, the mixture was cooled to below 10° C. After cooling, Formalin was added to the mixtures to effect the hardening of capsules. The capsules thus obtained were collected by filtration and dried by means of a fluidized bed dryer to give the microcapsule of gasoline having a particle size smaller than 200 meshes.

EXAMPLE 15

The same operation as described in Example 14 was repeated with exception that sodium lauryl sulfate was employed in place of sodium oleate. As a result, there was obtained the microcapsule of gasoline having a particle size smaller than 200 meshes.

EXAMPLE 16

10 g. of oil Red XO were emulsified by an ordinary method in 100 ml. of a 40% aqueous solution of gelatin. The emulsion was maintained at about 40° C. To the emulsion were with stirring added 70 ml. of toluene in which 0.5 g. of dodecyl benzene sulfonate were dispersed, followed by the sufficient mixing, and then the mixture was heated to 70° to 80° C. to effect the phase inversion. After completion of the phase inversion, the mixture was cooled to below 10° C. After cooling, Formalin was added to the mixture to effect the hardening of capsules. The capsules thus obtained were collected by filtration and dried by means of a fluidized bed dryer at 40° C. to give red microcapsules having a particle size smaller than 200 meshes.

EXAMPLE 17

The same operation as described in Example 16 was repeated with exception that 2 g. of dodecyl amine acetate were employed in place of dodecyl benzene sulfonate. As a result, there were obtained the similar red microcapsules having a particle size smaller than 200 meshes.

EXAMPLE 18

By employing an ultrasonic homogenizer, 30 g. of trichlorodiphenyl were emulsified in 200 ml. of a 35% aqueous solution of gelatin, so that the particle size of the emulsion was about 1μ. To the emulsion was added 10 g. of lauryl trimethylammonium chloride, followed by the sufficient mixing. To the mixture were with stirring added 300 mlu. of trichloroethylene at 50° to 60° C. to effect the phase inversion, so that trichlorodiphenyl having an emulsified particle size of about 1μ was dispersed in trichloroethylene. The dispersion was cooled to below 10° C. to effect the gelatin. Subsequently glutaric aldehyde was added to effect the hardening. As a result, there were formed microcapsules of trichlorodiphenyl. The resulting mixture was sprayed as such onto a supporting body such as a paper and dried to give a copying paper.

EXAMPLE 19

The same operation as described in Example 18 was repeated with exception that di-2-ethylhexylsulfosuccinate was employed in place of lauryl trimethylammonium chloride. As a result, there were obtained microcapsules of trichlorodiphenyl which have a particle size of about 1μ.

What we claim is:
1. A method for producing microcapsules of active chemical substance, which comprises the steps of:
  (1) forming an aqueous emulsion or suspension of an active chemical substance with an emulsifier or suspending agent,
  (2) adding an aqueous solution of a gelable hydrophilic substance to said emulsion or suspension obtained in step (1),
  (3) adding a surface active agent to the said emulsion or suspension obtained in step (2) or
  (4) adding a surface active agent to a solvent immiscible with said emulsion or suspension,
  (5) dispersing a liquid solvent immiscible with said emulsion or suspension into said emulson or suspension obtained in step (3) or dispersing said mixture consisting of a surface active agent and a liquid solvent obtained in step (4) into said emulsion or suspension obtained in step (2),
  (6) inversing the phase of said dispersion obtained in step (5) to form droplets
    (a) by adding an enough amount of a liquid solvent to inverse the phase, the solvent being miscible with said solvent used in step (5) but immiscible with the emulsion or suspension or
    (b) by raising the temperature of said dispersion up to an inversion temperature thereof, or
    (c) in case a mono-valent metallic surface active agent is used as the surface active agent in step (3) or (4), by adding an aqueous solution containing multi-valent metallic ion, the steps of (1), (2), (3), (4), (5) and (6) being conducted at a temperature above a gelation point of the aqueous emulsion or suspension,
  (7) stirring and then cooling the mixture obtained in step (6) to a temperature below the gelation point of the aqueous emulsion or suspension to cause the droplets gel to form microcapsules,
  (8) adding an aqueous solution of electrolyte to the mixture obtained in step (7) to harden the microcapsules, or
  (9) adding water-absorptive substance to the mixture obtained in step (7) to coat the microcapsules, or
  (10) washing and dehydrating by lower alkyl alcohols the microcapsules obtained in step (7), and
  (11) separating the microcapsules obtained in step (8), (9) or (10) by filtration, and
  (12) drying the microcapsules separated in step (11).

2. A method according to claim 1, wherein the chemical substance is oil soluble vitamins, water soluble vitamins or steroids.

3. A method according to claim 1, wherein the gelable hydrophilic substance is gelatin.

4. A method according to claim 1, wherein the liquid solvent is hexane.

5. A method according to claim 1, wherein the electrolyte is sodium sulfate.

6. A method according to claim 1, wherein the water absorptive substance is starch.

7. A method according to claim 1, wherein the lower alkyl alcohol is methanol, ethanol or isopropanol.

References Cited

UNITED STATES PATENTS

| | | |
|---|---|---|
| 2,886,445 | 5/1959 | Rosenthal et al. |
| 3,043,782 | 7/1962 | Jensen. |
| 3,069,370 | 12/1962 | Jensen et al. |
| 3,137,630 | 6/1964 | Hecker et al. |
| 3,173,878 | 3/1965 | Reyes. |

FOREIGN PATENTS

| | | |
|---|---|---|
| 795,977 | 6/1958 | Great Britain. |

RICHARD D. LOVERING, Primary Examiner

U.S. Cl. X.R.

8—79; 44—7; 71—64; 99—118, 166; 117—36.2, 100; 252—316, 522; 424—36, 236, 238, 280, 344